US012622340B2

(12) United States Patent     (10) Patent No.:   US 12,622,340 B2

Schroeder     (45) Date of Patent:     May 12, 2026

(54) SYSTEM AND METHOD FOR CONTROLLING THE OPERATION OF GROUND-ENGAGING TOOLS OF AN AGRICULTURAL IMPLEMENT

(71) Applicant: CNH Industrial America LLC, New Holland, PA (US)

(72) Inventor: Brittany Schroeder, Bunker Hill, IN (US)

(73) Assignee: CNH Industrial America LLC, New Holland, PA (US)

( * ) Notice: Subject to any disclaimer, the term of this patent is extended or adjusted under 35 U.S.C. 154(b) by 190 days.

(21) Appl. No.: 18/233,461

(22) Filed: Aug. 14, 2023

(65) Prior Publication Data

US 2025/0057069 A1     Feb. 20, 2025

(51) Int. Cl.
*A01B 79/00*     (2006.01)
*A01B 63/24*     (2006.01)

(52) U.S. Cl.
CPC ............ *A01B 79/005* (2013.01); *A01B 63/24* (2013.01)

(58) Field of Classification Search
CPC .............................. A01B 79/005; A01B 63/24
USPC ........................................................ 701/50
See application file for complete search history.

(56) References Cited

U.S. PATENT DOCUMENTS

| | | | |
|---|---|---|---|
| 2018/0206393 A1* | 7/2018 | Stoller | A01B 33/16 |
| 2020/0344939 A1* | 11/2020 | Sporrer | A01B 33/16 |
| 2021/0007266 A1* | 1/2021 | Stoller | G01S 13/885 |
| 2022/0078964 A1* | 3/2022 | Takeda | G06Q 50/02 |

FOREIGN PATENT DOCUMENTS

EP     3189719 A1     7/2017

OTHER PUBLICATIONS

U.S. Appl. No. 11/538,180, filed Dec. 27, 2022, Henry et al.
U.S. Appl. No. 11/632,895, filed Apr. 25, 2023, Sporrer et al.

* cited by examiner

*Primary Examiner* — Mahmoud S Ismail

(74) *Attorney, Agent, or Firm* — Dority & Manning, P.A.

(57)         ABSTRACT

A system for controlling the operation of ground-engaging tools of an agricultural implement includes a ground-engaging tool configured to be moved through the soil of a field. Furthermore, the system includes an actuator configured to apply a force on the ground-engaging tool. Additionally, the system includes a vision-based sensor configured to generate data indicative of a cellulose content of crop residue present within a field of view of the vision-based sensor. Moreover, the system includes a computing system communicatively coupled to the vision-based sensor and configured to determine the cellulose content of the crop residue based on the vision-based sensor data. Additionally, the computing system is configured to control the operation of the actuator based on the determined cellulose content.

17 Claims, 6 Drawing Sheets

SYSTEM AND METHOD FOR CONTROLLING THE OPERATION OF GROUND-ENGAGING TOOLS OF AN AGRICULTURAL IMPLEMENT

FIELD OF THE INVENTION

The present disclosure generally relates to agricultural implements and, more particularly, to systems and methods for controlling the operation of ground-engaging tools of an agricultural implement.

BACKGROUND OF THE INVENTION

It is well known that, to attain the best agricultural performance from a field, a farmer must cultivate the soil, typically through a tillage operation. Modern farmers perform tillage operations by pulling an agricultural implement, such as a tillage implement, behind an agricultural work vehicle, such as a tractor. For example, tillage implements generally include ground-engaging tillage tools, such as shanks, disk blades, and/or the like, supported on its frame. Each ground-engaging tool, in turn, is configured to be moved relative to the soil within the field as the tillage implement travels across the field. Such movement of the ground-engaging tools loosens and/or otherwise agitates the soil to prepare the field for subsequent planting operations.

As the agricultural implement travels across the field, the implement may encounter varying field conditions. For example, the size and/or cellulose content of crop residue, particularly corn stalks, present on the surface of the field may vary. As such, larger crop residue tends to wrap around and become stuck on the ground-engaging tools than smaller crop residue and needs to be broken up. However, crop residue with higher cellulose content is more difficult to break up than crop residue with lower cellulose content.

Accordingly, an improved system and method for controlling the operation of ground-engaging tools of an agricultural implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for controlling the operation of ground-engaging tools of an agricultural implement. The system includes a ground-engaging tool configured to be moved through the soil of a field. Additionally, the system includes an actuator configured to apply a force on the ground-engaging tool. Furthermore, the system includes a vision-based sensor configured to generate data indicative of a cellulose content of crop residue present within a field of view of the vision-based sensor. Moreover, the system includes a computing system communicatively coupled to the vision-based sensor. The computing system is configured to determine the cellulose content of the crop residue based on the vision-based sensor data. Additionally, the computing system is configured to control an operation of the actuator based on the determined cellulose content.

In another aspect, the present subject matter is directed to a method for controlling the operation of ground-engaging tools of an agricultural implement. The agricultural implement includes a ground-engaging tool configured to be moved through the soil of a field. Additionally, the agricultural implement includes an actuator configured to apply a force on the ground-engaging tool. The method includes receiving, with a computing system, vision-based sensor data indicative of a cellulose content of crop residue within a field of view of the vision-based sensor. Furthermore, the method includes determining, with the computing system, the cellulose content of the crop residue based on the received vision-based sensor data. Additionally, the method includes controlling, with the computing system, an operation of the actuator based on the determined cellulose content.

In a further aspect, the present subject matter is directed to an agricultural implement. The agricultural implement includes a frame and a disk blade supported relative to the frame and configured to be moved through the soil of a field. Additionally, the agricultural implement includes an actuator configured to apply a force on the disk blade. Furthermore, the agricultural implement includes a vision-based sensor configured to generate data indicative of a cellulose content of crop residue present within a field of view of the vision-based sensor. Moreover, the agricultural implement includes a computing system communicatively coupled to the vision-based sensor. The computing system is configured to determine the cellulose content of the crop residue based on the vision-based sensor data. Furthermore, the computing system is configured to control an operation of the actuator based on the determined cellulose content.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
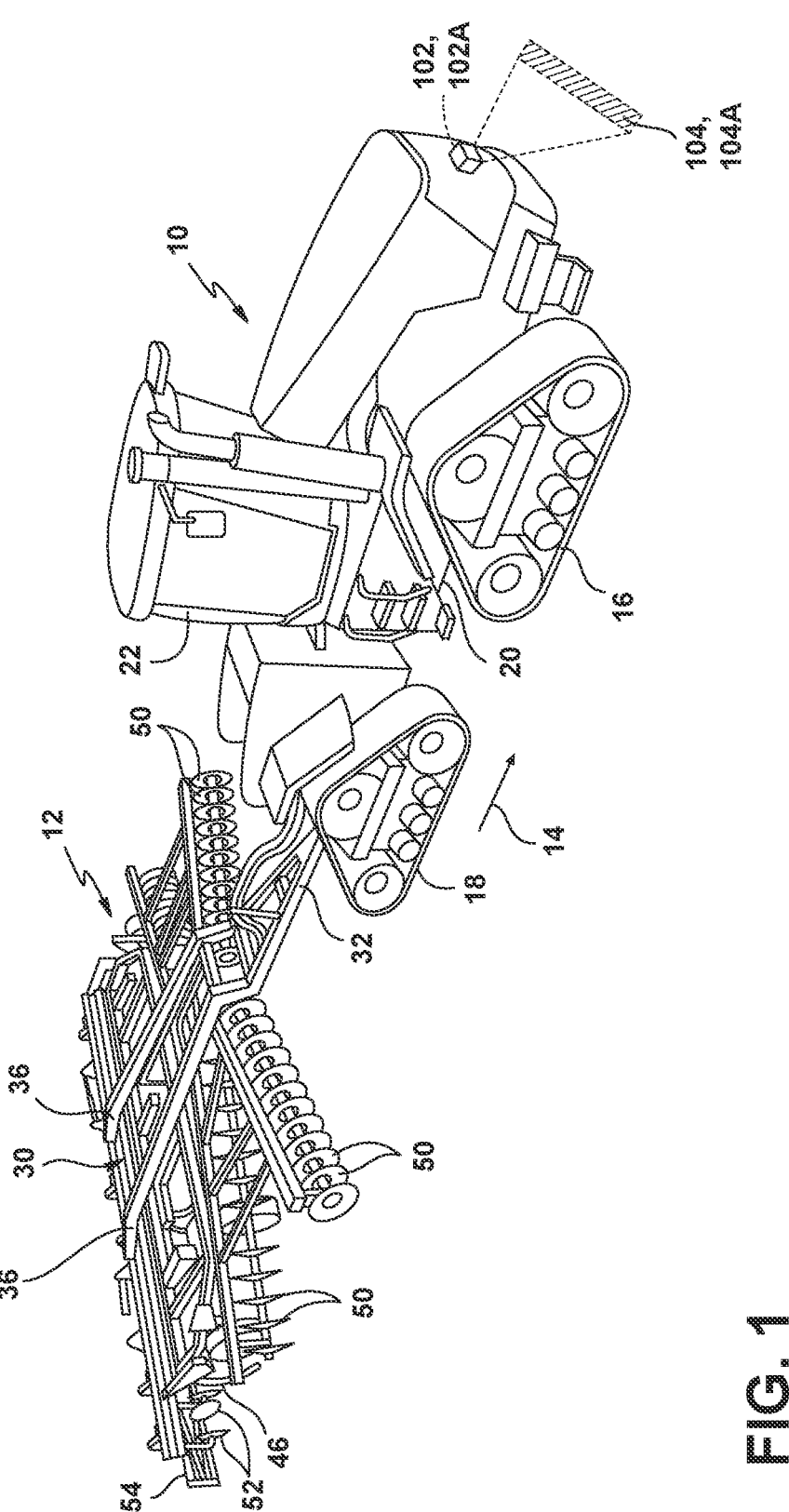
FIG. 1 illustrates a perspective view of one embodiment of a work vehicle towing an agricultural implement in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield still a further embodiment. Thus, it is intended that the present invention covers such modifications and variations as come within the scope of the appended claims and their equivalents.

In general, the present subject matter is directed to a system and a method for controlling the operation of ground-engaging tools of an agricultural implement. As will be described below, the agricultural implement includes one or more ground-engaging tools, such as one or more disk blades. Each disk blade is supported by the frame of the agricultural implement and configured to be moved through the soil of the field across which the agricultural implement is traveling. For example, in some embodiments, the disk blade(s) may be configured to cut and size the residue present on the surface of the field. As such, the agricultural implement includes an actuator(s) (e.g., a hydraulic cylinder(s)) configured to apply a force to the ground-engaging tool(s).

In several embodiments, a computing system of the disclosed system is configured to control the operation of the actuator(s) based on the cellulose content of the crop residue. More specifically, the computing system is configured to receive data from a vision-based sensor(s) indicative of the cellulose content of the crop residue. For example, in some embodiments, the computing system may receive data from the vision-based sensor(s) based on received reflections of output light waves emitted by the vision-based sensor(s) and directed at the crop residue present on the portion of the field within the field of view of the vision-based sensor(s). Thereafter, the computing system may determine the cellulose content of the crop residue based on the vision-based sensor data. For example, in some embodiments, the computing system may be configured to determine a parameter, such as the transparency of the soil residue, indicative of a light penetration through the crop residue based on the received reflections of the output light waves. As such, the computing system may be configured to determine the cellulose content of the crop residue based on the based on the transparency or other determined parameter of the soil residue. Furthermore, the computing system may be configured to compare the determined cellulose content of the crop residue to a predetermined cellulose content range. As such, the computing system may be configured to control the operation of the actuator to increase the force applied to the ground-engaging tool(s) when the determined cellulose content exceeds the predetermined cellulose content range and decrease the force applied to the ground-engaging tool(s) when the determined cellulose content falls below the predetermined cellulose content range.

Controlling the force being applied the ground-engaging tools (e.g., the disk blades) of an agricultural implement based on the cellulose content of crop residue present on the surface of the field improves the operation of the implement. Generally, the cellulose content of crop residue and the rigidity of crop residue are related such that the higher the cellulose content of crop residue, the higher the rigidity of the crop residue. Unlike many other types of crop residue, such as leaves, straw (e.g., wheat straw), stubble, and/or the like, crop residue with high cellulose content, such as corn stalks that have been severed from their root balls and are present on the surface of the field, are particularly rigid and difficult to break up. As such, corn stalks can become wrapped around hangers (e.g., C-hangers), disk gang shafts, and other components or tools of the implement in a manner that can slow or prevent rotation of the associated disk blades when not broken into small enough pieces. As such, the force applied by the ground-engaging tools of the agricultural implement may need to increase to properly break up crop residue with higher cellulose content. In this respect, adjusting the force applied by the ground-engaging tool(s) based on the cellulose content of the crop residue will ensure the crop residue is properly sized and doesn't become wrapped around the hangers or other portions of the agricultural implement.

Figure 2:
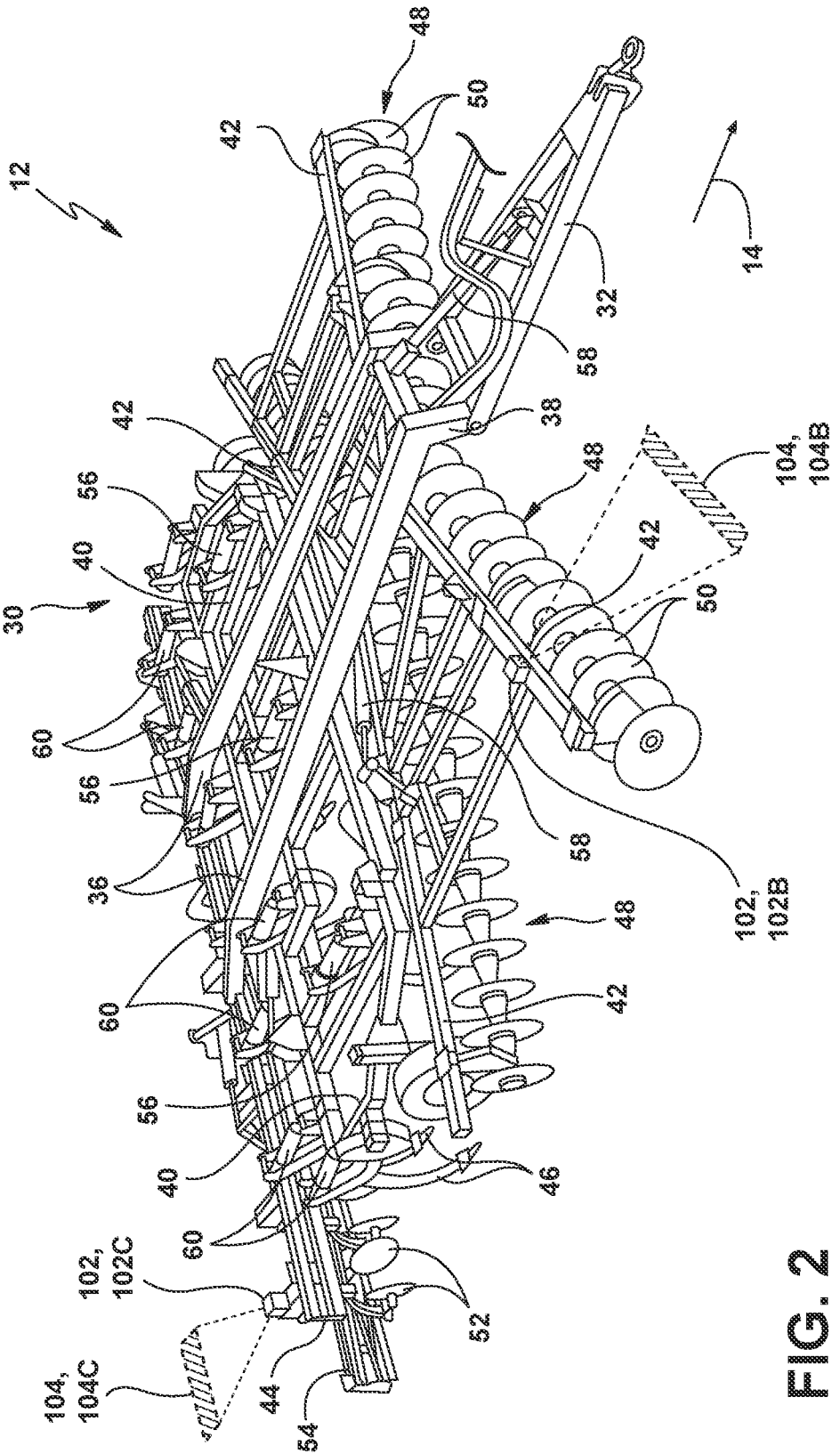
FIG. 2 illustrates a perspective view of the agricultural implement shown in FIG. 1.

Referring now to drawings, FIGS. 1 and 2 illustrate perspective views of one embodiment of a work vehicle 10 and an associated agricultural implement 12 in accordance with aspects of the present subject matter. Specifically, FIG. 1 illustrates a perspective view of the work vehicle 10 towing the agricultural implement 12 across a field in a travel direction (e.g., as indicated by arrow 14). Additionally, FIG. 2 illustrates a perspective view of the agricultural implement 12 shown in FIG. 1.

As shown, in the illustrated embodiment, the work vehicle 10 is configured as an agricultural tractor and the agricultural implement 12 is configured as a tillage implement (e.g., a disk ripper). However, in other embodiments, the work vehicle 10 may be configured as any other suitable agricultural or other type of work vehicle. Similarly, in other embodiments, the agricultural implement 12 may be configured as any other suitable agricultural implement configured to be towed by a work vehicle, such as a seed-planting implement (e.g., a seeder, a planter, a side dresser, etc.).

As particularly shown in FIG. 1, the work vehicle 10 includes a pair of front track assemblies 16, a pair or rear track assemblies 18, and a frame or chassis 20 coupled to and supported by the track assemblies 16, 18. However, in other embodiments, the work vehicle 10 may include wheels and tires (not shown) in addition to or in lieu of the track assemblies. An operator's cab 22 may be supported by a portion of the chassis 20 and may house various input devices for permitting an operator to control the operation of one or more components of the work vehicle 10 and/or one or more components of the implement 12.

Additionally, as shown in FIGS. 1 and 2, the implement 12 may generally include a carriage frame assembly 30 configured to be towed by the work vehicle 10 via a pull hitch or tow bar 32 in the travel direction 14 of the vehicle/implement 10/12. In general, the carriage frame assembly 30 may support a plurality of ground-engaging tools, such as a plurality of shanks, disk blades, leveling blades, basket assemblies, tines, spikes, and/or the like. In several embodiments, the various ground-engaging tools may be configured to perform an agricultural operation, such as a tillage operation or any other suitable ground-engaging operation, across the field along which the implement 12 is being towed.

As particularly shown in FIG. 2, the carriage frame assembly 30 may include aft extending carrier frame members 36 coupled to the tow bar 32. In addition, reinforcing gusset plates 38 may be used to strengthen the connection between the tow bar 32 and the carrier frame members 36. In several embodiments, the carriage frame assembly 30 may generally support a central frame 40, a forward frame 42 positioned forward of the central frame 40 relative to the travel direction 14 of the vehicle/implement 10/12, and an aft frame 44 positioned aft of the central frame 40 relative to the travel direction 14 of the vehicle/implement 10/12. As shown, in one embodiment, the central frame 40 may correspond to a shank frame configured to support a plurality of ground-engaging shanks 46. In such an embodiment, the shanks 46 are configured to till or otherwise engage the soil as the implement 12 is towed across the field. However, in other embodiments, the central frame 40 may be configured to support any other suitable ground-engaging tools.

Additionally, as shown in FIG. 2, in one embodiment, the forward frame 42 may correspond to a disk frame configured to support various gangs or sets 48 of disk blades 50. Specifically, the disk blades 50 are spaced apart from each other along the length of the disk gang 48 and configured to rotate relative to the soil within the field as the agricultural implement 12 travels across the field in the travel direction 14. Furthermore, each disk blade 50 may include both a concave side (not shown) and a convex side (not shown). In addition, the various gangs 48 of disk blades 50 may be oriented at an angle relative to the travel direction 14 of the vehicle/implement 10/12 to promote more effective tilling of the soil. However, in other embodiments, the forward frame 42 may be configured to support any other suitable ground-engaging tools.

Moreover, like the central and forward frames 40, 42, the aft frame 44 may also be configured to support a plurality of ground-engaging tools. For instance, in the illustrated embodiment, the aft frame 44 is configured to support a plurality of leveling blades 52 and rolling (or crumbler) basket assemblies 54. However, in other embodiments, any other suitable ground-engaging tools may be coupled to and supported by the aft frame 44, such as a plurality of closing disk blades.

In addition, the implement 12 may also include any number of suitable ground-engaging tool actuators (e.g., hydraulic cylinders, electric linear actuators, etc.) for adjusting the relative positioning of, the penetration depth of, and/or the force being applied to the various ground-engaging tools 46, 50, 52, 54. For instance, the implement 12 may include one or more actuators 56 coupled to the central frame 40 for raising and/or lowering the central frame 40 relative to the ground, thereby allowing the penetration depth of and/or the force being applied to the shanks 46 to be adjusted. Similarly, the implement 12 may include one or more actuators 58 coupled to the forward frame 42 to adjust the positioning relative to the carriage frame 30 of, the penetration depth of, and/or the force being applied to the disk blades 50. Moreover, the implement 12 may include one or more actuators 60 coupled to the aft frame 44 to allow the aft frame 44 to be moved relative to the central frame 40, thereby allowing the relevant operating parameters of the ground-engaging tools 52, 54 supported by the aft frame 44 (e.g., the force being applied to and/or the penetration depth of) to be adjusted.

Moreover, the work vehicle 10 and/or the agricultural implement 12 may include one or more vision-based sensors 102 coupled thereto and/or supported thereon. More specifically, the vision-based sensor(s) 102 is configured to generate data indicative of a cellulose content of crop residue (e.g., corn stalks). Such cellulose content data and size data may subsequently be used to control the amount of force applied by the disk blades 50 of the agricultural implement 12 to the field surface.

In general, the vision-based sensor(s) 102 may correspond to any suitable sensing device(s) configured to generate data indicative of the cellulose content and/or the size of the crop residue. In several embodiments, the vision-based sensor(s) 102 is configured to emit output light waves directed at the crop residue in the portion of the field present within its field of view 104 as the vehicle/implement 10/12 moves across the field in the travel direction 14. The output light waves emitted by the vision-based sensor(s) 102 may be received as reflections by the vision-based sensor(s) 102 and then analyzed to determine cellulose content data of the corn stalks and other crop residue. Furthermore, in several embodiments, the vision-based sensor(s) 102 is configured to generate data indicative of a size of the crop residue (e.g., corn stalks), such as the diameter, length, and/or other dimensions.

Specifically, in several embodiments, the vision-based sensor(s) 102 may correspond to a suitable camera(s) configured to emit output light waves at, and capture images of, the crop residue of the field present on the portion of the field within the field(s) of view 104 of the vision-based sensor(s) 102, thereby allowing the cellulose content, and/or dimensions (e.g., diameters, lengths) of the corn stalks and other crop residue present on the surface of the field to be determined by analyzing the content of each image. For instance, in a particular embodiment, each vision-based sensor(s) 102 may correspond to a stereographic camera(s) having two or more lenses with a separate image sensor for each lens to allow the cameras to capture stereographic or three-dimensional images. Alternatively, the vision-based sensor(s) 102 may correspond to any other suitable devices for generating image data or image-like data, such as a monocular camera(s), a LiDAR device(s), a RADAR device(s), and/or the like.

The vision-based sensor(s) 102 may be mounted at any suitable location(s) on the work vehicle 10 and/or the agricultural implement 12 that allows each vision-based sensor 102 to generate data indicative of the cellulose content of the crop residue present within the field of view 104 of the vision-based sensor(s) 102. For example, in the illustrated embodiment, a first vision-based sensor 102A is mounted on the forward end of the work vehicle 10 such that the first vision-based sensor 102A has a field of view 104A directed at a portion of the field forward of the vehicle 10, and thus forward of the disk blades 50 of the implement 12 relative to the direction of travel 14.

Additionally, or alternatively, a second vision-based sensor 102B may be mounted on the forward end of the implement 12 (e.g., on the forward frame 42) such that the field of view 104B of the second vision-based sensor 102B is directed at a portion of the field forward of the implement 12, and thus forward of the disk blades 50 of the implement 12 relative to the direction of travel 14.

Furthermore, a third vision-based sensor 102C is mounted on the aft end of the agricultural implement 12 such that the field of view 104C of the third vision-based sensor 102C is directed at a portion of the field aft of the implement 12, and thus aft of the disk blades 50 of the implement 12 relative to the direction of travel 14.

However, in alternative embodiments, the implement 12 and/or vehicle 10 may include any other suitable number of vision-based sensors 102 and/or such vision-based sensors 102 may be mounted at any other suitable locations on the work vehicle 10 and/or the agricultural implement 12 that allows each vision-based sensor 102 to generate data indicative of the cellulose content of the crop residue present within the fields of view 104 of the vision-based sensors 102.

Figure 3:
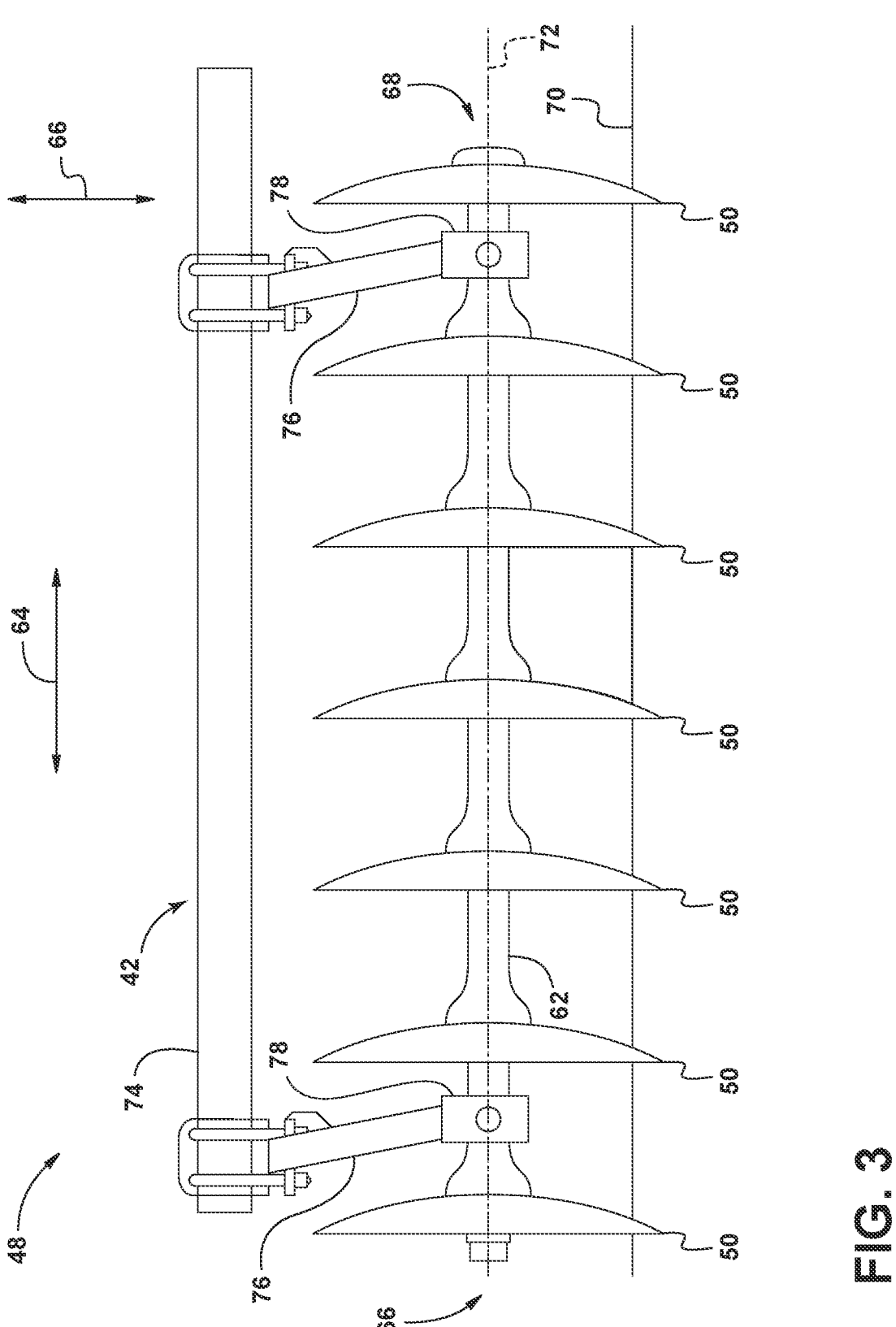
FIG. 3 illustrates a front view of one embodiment of a disk gang of an agricultural implement in accordance with aspects of the present subject matter.

Referring now to FIG. 3, a front view of one embodiment of one of the disk gangs 48 of the implement 12 is illustrated in accordance with aspects of the present subject matter. Specifically, in several embodiments, the disk gang 48 may include a disk gang shaft 62 that extends along an axial direction or length of the disk gang 48 (e.g., as indicated by arrow 64 in FIG. 3) between a first end 66 and a second end 68. As shown, the disk blades 50 are coupled to the disk gang shaft 62 and spaced apart from each other along the axial direction 64. As the implement 12 travels across a field, the disk blades 50 penetrate the soil surface (e.g., as indicated by line 70 in FIG. 3) of the field and rotate about an axis of rotation (e.g., as indicated by dashed line 72 in FIG. 3) relative to the soil within the field.

In general, the disk gang 48 is supported relative to a corresponding support arm 74 of the forward frame 42 of the agricultural implement 12. Specifically, in several embodiments, a pair of hangers 76 (e.g., C-hangers) support the disk gang 48 at a position below the support arm 74. For example, in one embodiment, one end of each hanger 76 may be coupled to the support arm 74, while the opposing end of each hanger 76 is coupled to a bearing block 78. The bearing blocks 78, in turn, are rotatably coupled to the disk gang shaft 56. However, in alternative embodiments, the disk gang 48 may have any other suitable configuration.

The configuration of the work vehicle 10 and the agricultural implement 12 described and shown in FIGS. 1-3 is provided only to place the present subject matter in an exemplary field of use. Thus, the present subject matter may be readily adaptable to any manner of work vehicle and/or agricultural implement configuration.

Figure 4:
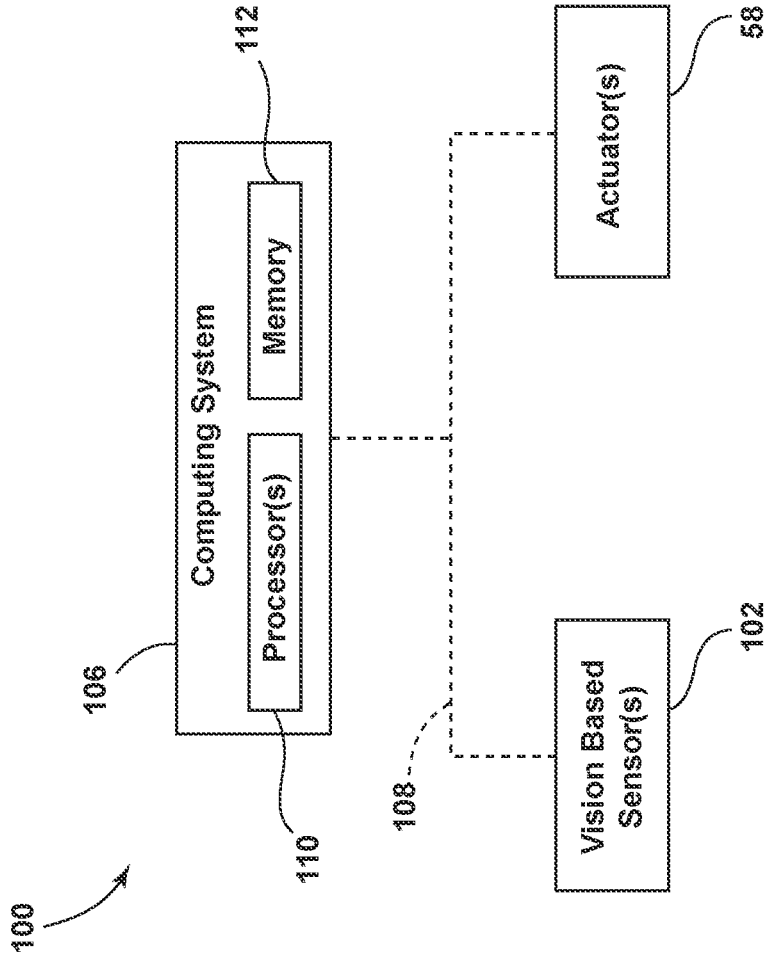
FIG. 4 illustrates a schematic view of one embodiment of a system for determining soil penetration depth of ground-engaging tools of an agricultural implement in accordance with aspects of the present subject matter.

Referring now to FIG. 4, a schematic view of one embodiment of a system 100 for controlling the operation of ground-engaging tools of an agricultural implement is illustrated in accordance with aspects of the present subject matter. In general, the system 100 will be described herein with reference to the work vehicle 10 and the agricultural implement 12 described above with reference to FIGS. 1-3. However, it should be appreciated by those of ordinary skill in the art that the disclosed system 100 may generally be utilized with work vehicles having any other suitable vehicle configuration and/or agricultural implements having any other suitable implement configuration.

As shown in FIG. 4, the system 100 includes a computing system 106 communicatively coupled to one or more components of the work vehicle 10, the agricultural implement 12, and/or the system 100 to allow the operation of such components to be electronically or automatically controlled by the computing system 106. For instance, the computing system 106 may be communicatively coupled to the vision-based sensor(s) 102 via a communicative link 108. As such, the computing system 106 may be configured to receive data from the vision-based sensor(s) 102 that is indicative of the cellulose content of the crop residue, such as the corns stalks, present within the field across which the vehicle/implement 10/12 is traveling. Additionally, in several embodiments, the computing system 106 is configured to receive data from the vision-based sensor(s) 102 indicative of the size of the crop residue present within the field across which the vehicle/implement 10/12 is traveling. Furthermore, the computing system 106 may be communicatively coupled to the actuator(s) 58 via the communicative link 108. In this respect, the computing system 106 may be configured to control the operation of the actuator(s) 58 to adjust the force being applied to, the penetration depth of, and/or the position relative to the carriage frame 30 of the disk blades 50. In addition, the computing system 106 may be communicatively coupled to any other suitable components of the work vehicle 10, the agricultural implement 12, and/or the system 100. For example, the computing system

106 may be communicatively coupled to the actuators 56, 60 of the agricultural implement 12 via the communicative link 108.

In general, the computing system 106 may comprise one or more processor-based devices, such as a given controller or computing device or any suitable combination of controllers or computing devices. Thus, in several embodiments, the computing system 106 may include one or more processor(s) 110 and associated memory device(s) 112 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 112 of the computing system 106 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 112 may generally be configured to store suitable computer-readable instructions that, when implemented by the processor(s) 110, configure the computing system 106 to perform various computer-implemented functions, such as one or more aspects of the methods and algorithms that will be described herein. In addition, the computing system 106 may also include various other suitable components, such as a communications circuit or module, one or more input/output channels, a data/control bus and/or the like.

The various functions of the computing system 106 may be performed by a single processor-based device or may be distributed across any number of processor-based devices, in which instance, such devices may be considered to form part of the computing system 106. For instance, the functions of the computing system 106 may be distributed across multiple application-specific controllers or computing devices, such as a navigation controller, an engine controller, a transmission controller, an implement controller, and/or the like.

Figure 5:
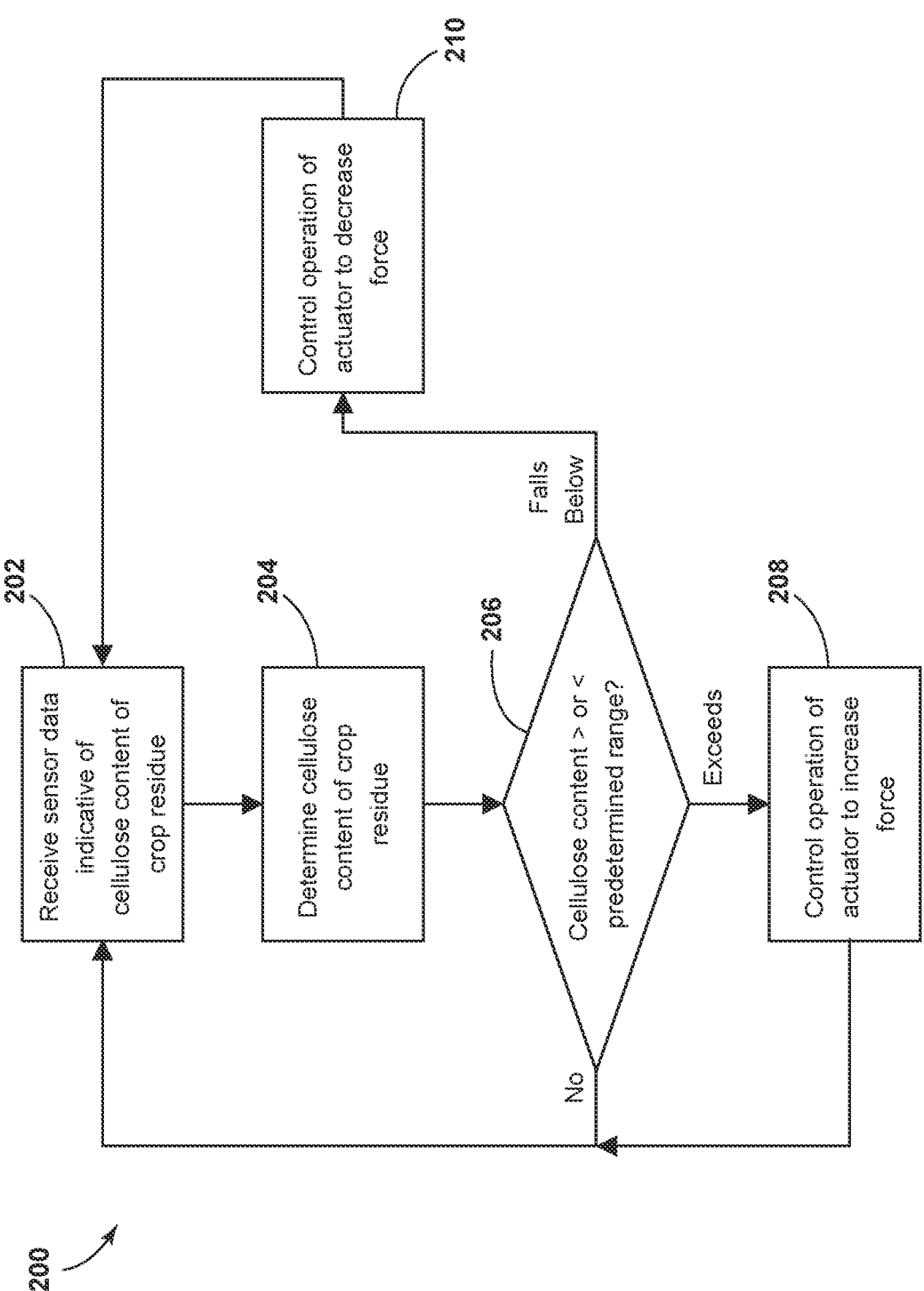
FIG. 5 illustrates a flow diagram providing one embodiment of control logic for determining soil penetration depth of ground-engaging tools of an agricultural implement in accordance with aspects of the present subject matter.

Referring now to FIG. 5, a flow diagram of one embodiment of control logic 200 that may be executed by the computing system 106 (or any other suitable computing system) for controlling the operation of ground-engaging tools of an agricultural implement is illustrated in accordance with aspects of the present subject matter. Specifically, the control logic 200 shown in FIG. 5 is representative of steps of one embodiment of an algorithm that can be executed to control the operation of ground-engaging tools of an agricultural implement in a manner that ensures crop residue is properly sized as the cellulose content of the crop residue varies throughout the field. Thus, in several embodiments, the control logic 200 may be advantageously utilized in association with a system installed on or forming part of a work vehicle and/or an agricultural implement to allow for real-time control of the agricultural implement without requiring substantial computing resources and/or processing time. However, in other embodiments, the control logic 200 may be used in association with any other suitable system, application, and/or the like for controlling the operation of ground-engaging tools of an agricultural implement.

As shown, at (202), the control logic 200 includes receiving data from a vision-based sensor indicative of a cellulose content of crop residue present within a field of view of the vision-based sensor. Specifically, as described above, in several embodiments, the computing system 106 may be communicatively coupled to the vision-based sensor(s) 102 via the communicative link 108. In this respect, as the work vehicle 10 and agricultural implement 12 travel across the field to perform an agricultural operation thereon, the computing system 106 may receive data from the vision-based sensor(s) 102. Such data may, in turn, be indicative of the cellulose content of the crop residue within the portion(s) of the field present within the field(s) of view 104 of the vision-based sensor(s) 102. As will be described below, such data is used to control the operation of the actuator to adjust the force applied to the ground-engaging tool(s).

Furthermore, at (204), the control logic 200 includes determining the cellulose content of the crop residue based on the received vision-based sensor data. Specifically, the computing system 106 may be configured to determine the cellulose content of the crop residue based on the received vision-based sensor data.

For example, in several embodiments, the computing system 106 is configured to determine a parameter indicative of a light penetration through the crop residue (e.g., corn stalks) based on received reflections of the light output waves emitted by the vision-based sensor(s) 102. In this respect, the computing system 106 may be configured to determine an angle of refraction of the light waves through the crop residue, phase velocity of the light waves through the crop residue, and/or other parameters indicative of light penetration through the crop residue. As such, the computing system 106 may be configured to determine the cellulose content, such as the quantity of cellulose in the corn stalks, based on the parameter indicative of light penetration through the crop residue. For example, the greater angle of refraction and/or lesser phase velocity of the light waves through the crop residue may be indicative of a higher quantity of cellulose content within the crop residue, while a lesser angle of refraction and/or greater phase velocity of the light waves through the crop residue may be indicative of a lower quantity of cellulose content within the crop residue. However, it should be appreciated that the computing system 106 may be configured to determine the cellulose content of the crop residue based on the received vision-based sensor data in any other suitable manner.

Additionally, in several embodiments, after determining the cellulose content of the crop residue based on the received vision-based sensor data, the computing system 106 may be configured to notify an operator of the agricultural implement/vehicle 12/10 of the determined cellulose content of the crop residue.

Moreover, at (206), the control logic 200 includes comparing the determined cellulose content of the crop residue to a predetermined cellulose content range. Specifically, the computing system 106 is configured to compare the cellulose content of the crop residue determined at (204) to the predetermined cellulose content range. Higher cellulose content of the corn stalks and other crop residue requires a greater force applied to the disk blades 50 to break up the corn stalks and other crop residue than lower cellulose content. In this respect, the predetermined cellulose content range may correspond to a range of cellulose content of the crop residue not requiring an adjustment to the force applied to the disk blades 50. Therefore, when the determined cellulose content of the crop residue exceeds the predetermined cellulose content range, the control logic 200 proceeds to (208). Alternatively, when the determined cellulose content of the crop residue falls below the predetermined cellulose content range, the control logic 200 proceeds to (210). Alternatively, when the determined cellulose content of the crop residue does not exceed or fall below the predetermined cellulose content range, the control logic 200 returns to (202).

Furthermore, at (208), the control logic 200 includes controlling the operation of the actuator to increase the force applied to the ground-engaging tool when the determined cellulose content exceeds the predetermined cellulose content range. Specifically, as described above, the computing system 106 may be communicatively coupled to the actuator(s) 58 via the communicative link 108. In this respect, as the work vehicle 10 and agricultural implement 12 travel across the field to perform an agricultural operation thereon, the computing system 106 may control the operation of the actuator(s) 58 such that the force applied to the disk blades 50 is increased when the determined cellulose content exceeds the predetermined cellulose content range. Thereafter, the control logic 200 returns to (202).

Moreover, at (210) the control logic 200 includes controlling the operation of the actuator to decrease the force applied to the ground-engaging tool when the determined cellulose content falls below the predetermined cellulose content range. Specifically, as described above, the computing system 106 may be communicatively coupled to the actuator(s) 58 via the communicative link 108. In this respect, as the work vehicle 10 and agricultural implement 12 travel across the field to perform an agricultural operation thereon, the computing system 106 may control the operation of the actuator(s) 58 such that the force applied to the disk blades 50 is decreased when the determined cellulose content falls below the predetermined cellulose content range. Thereafter, the control logic 200 returns to (202).

It should be appreciated that, in alternative embodiments, the control logic 200 described above may include additional steps. For example, the control logic 200 may include receiving data from the vision-based sensor(s) 102 indicative of a size of the crop residue, determining the size of the crop residue based on the vision-based sensor data, and/or controlling the operation of the actuator(s) 58 based on the determined size of the crop residue.

Figure 6:
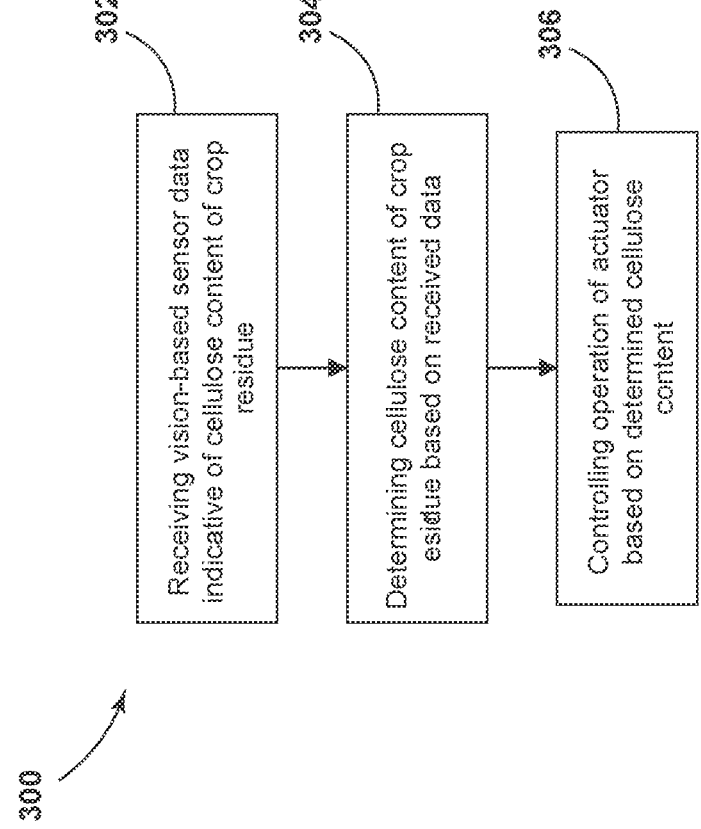
FIG. 6 illustrates a flow diagram of one embodiment of a method for determining soil penetration depth of ground-engaging tools of an agricultural implement in accordance with aspects of the present subject matter.

Referring now to FIG. 6, a flow diagram of one embodiment of a method 300 for controlling the operation of ground-engaging tools of an agricultural implement is illustrated in accordance with aspects of the present subject matter. In general, the method 300 will be described herein with reference to the work vehicle 10, the agricultural implement 12, and the system 100 described above with reference to FIGS. 1-5. However, it should be appreciated by those of ordinary skill in the art that the disclosed method 300 may generally be implemented with any work vehicle having any suitable vehicle configuration, any agricultural implement having any suitable implement configuration, and/or within any system having any suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (302), the method 300 includes receiving, with a computing system, vision-based sensor data indicative of a cellulose content of the crop residue present within a field of view of the vision-based sensor. For instance, as described above, the computing system 106 may be configured to receive data from the vision-based sensor(s)

102 indicative of the cellulose content of the crop residue present within the field(s) of view 104 of the vision-based sensor(s) 102. Such data, in turn, is of crop residue positioned in one or more portions of a field positioned forward and/or aft of the disk blades 50 or other ground-engaging tools of the implement 12 relative to the travel direction 14 of the agricultural implement 12.

Furthermore, at (304), the method 300 includes determining, with the computing system, the cellulose content of the crop residue based on the received vision-based sensor data. For instance, as described above, the computing system 106 may be configured to determine the cellulose content of the crop residue based on the data received from the vision-based sensor(s) 102.

Additionally, at (306), the method 300 includes controlling, with the computing system, an operation of the actuator based on the determined cellulose content. For instance, as described above, the computing system 106 may be configured to control the operation of the actuator(s) 58 of the agricultural implement 12 such that the force applied to the disk blades 50 is adjusted when the determined cellulose content falls outside of the predetermined cellulose content range.

It is to be understood that the steps of the control logic 200 and the method 300 are performed by the computing system 106 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 106 described herein, such as the control logic 200 and the method 300, is implemented in software code or instructions which are tangibly stored on a tangible computer readable medium. The computing system 106 loads the software code or instructions via a direct interface with the computer readable medium or via a wired and/or wireless network. Upon loading and executing such software code or instructions by the computing system 106, the computing system 106 may perform any of the functionality of the computing system 106 described herein, including any steps of the control logic 200 and the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A method for controlling the operation of ground-engaging tools of an agricultural implement, the agricultural implement including a ground-engaging tool configured to be moved through the soil of a field, the agricultural implement further including an actuator configured to apply a force on the ground-engaging tool, the method comprising:
    receiving reflections of output light waves emitted by a vision-based sensor;
    determining, with a computing system, a parameter indicative of a light penetration through crop residue based on the received reflections of the output light waves;
    determining, with the computing system, the cellulose content of the crop residue based on the determined parameter; and
    controlling, with the computing system, an operation of the actuator based on the determined cellulose content.

2. The method of claim 1, wherein, when controlling the operation of the actuator based on the determined cellulose content, the method further comprises:
    comparing, with the computing system, the determined cellulose content of the crop residue to a predetermined cellulose content range; and
    controlling, with the computing system, the operation of the actuator to adjust the force applied to the ground-engaging tool when the determined cellulose content falls outside of the predetermined cellulose content range.

3. The method of claim 2, wherein, when controlling the operation of the actuator to adjust the force applied to the ground-engaging tool when the determined cellulose content falls outside of the predetermined cellulose content range, the method further comprises:
    controlling, with the computing system, the operation of the actuator to increase the force applied to the ground-engaging tool when the determined cellulose content exceeds the predetermined cellulose content range.

4. The method of claim 2, wherein, when controlling the operation of the actuator to adjust the force applied to the ground-engaging tool when the determined cellulose content falls outside of the predetermined cellulose content range, the method further comprises:
    controlling, with the computing system, the operation of the actuator to decrease the force applied to the ground-engaging tool when the determined cellulose content falls below the predetermined cellulose content range.

5. The method of claim 1, further comprising:
    determining, with the computing system, a size of the crop residue based on the determined parameter; and
    controlling, with the computing system, the operation of the actuator based on the determined size.

6. The method of claim 1, further comprising:
    notifying, with the computing system, an operator of the agricultural implement of the determined cellulose content.

7. An agricultural implement, comprising:
    a frame;
    a disk blade supported relative to the frame and configured to be moved through the soil of a field;
    an actuator configured to apply a force on the disk blade;
    a vision-based sensor configured to emit output light waves directed at crop residue present on a portion of the field within a field of view of the vision-based sensor and receive reflections of the output light waves; and a computing system communicatively coupled to the vision-based sensor, the computing system configured to:

determine a parameter indicative of a light penetration through the crop residue based on the received reflections of the output light waves;

determine the cellulose content of the crop residue based on the determined parameter; and control an operation of the actuator based on the determined cellulose content.

8. The agricultural implement of claim 7, wherein, when controlling the operation of the actuator based on the determined cellulose content, the computing system is further configured to:

compare the determined cellulose content of the crop residue to a predetermined cellulose content range; and control the operation of the actuator to adjust the force applied to the disk blade when the determined cellulose content falls outside of the predetermined cellulose content range.

9. The agricultural implement of claim 8, wherein, when controlling the operation of the actuator to adjust the force applied to the disk blade when the determined cellulose content falls outside of the predetermined cellulose content range, the computing system is further configured to:

control the operation of the actuator to increase the force applied to the disk blade when the determined cellulose content exceeds the predetermined cellulose content range.

10. The agricultural implement of claim 8, wherein, when controlling the operation of the actuator to adjust the force applied to the disk blade when the determined cellulose content falls outside of the predetermined cellulose content range, the computing system is further configured to:

control the operation of the actuator to decrease the force applied to the disk blade when the determined cellulose content falls below the predetermined cellulose content range.

11. A system for controlling the operation of ground-engaging tools of an agricultural implement, the system comprising:

a ground-engaging tool configured to be moved through the soil of a field;

an actuator configured to apply a force on the ground-engaging tool;

a vision-based sensor configured to emit output light waves directed at the crop residue present on a portion of the field within the field of view and receive reflections of the output light waves; and a computing system communicatively coupled to the vision-based sensor, the computing system configured to:

determine a parameter indicative of a light penetration through the crop residue based on the received reflections of the output light waves;

determine the cellulose content of the crop residue based on the determined parameter; and control an operation of the actuator based on the determined cellulose content.

12. The system of claim 11, wherein, when controlling the operation of the actuator based on the determined cellulose content, the computing system is further configured to:

compare the determined cellulose content of the crop residue to a predetermined cellulose content range; and control the operation of the actuator to adjust the force applied to the ground-engaging tool when the determined cellulose content falls outside of the predetermined cellulose content range.

13. The system of claim 12, wherein, when controlling the operation of the actuator to adjust the force applied to the ground-engaging tool when the determined cellulose content falls outside of the predetermined cellulose content range, the computing system is further configured to:

control the operation of the actuator to increase the force applied to the ground-engaging tool when the determined cellulose content exceeds the predetermined cellulose content range.

14. The system of claim 12, wherein, when controlling the operation of the actuator to adjust the force applied to the ground-engaging tool when the determined cellulose content falls outside of the predetermined cellulose content range, the computing system is further configured to:

control the operation of the actuator to decrease the force applied to the ground-engaging tool when the determined cellulose content falls below the predetermined cellulose content range.

15. The system of claim 11, wherein the computing system is further configured to:

determine a size of the crop residue based on the determined parameter; and control the operation of the actuator based on the determined size.

16. The system of claim 11, wherein the computing system is further configured to:

notify an operator of the agricultural implement of the determined cellulose content.

17. The system of claim 11, wherein the ground-engaging tool comprises a disk blade.

* * * * *